United States Patent [19]

Bennett, Jr. et al.

[11] 4,092,294

[45] May 30, 1978

[54] METHOD FOR PREPARING POLYPHENYLENE ETHERS

[75] Inventors: James G. Bennett, Jr.; Glenn Dale Cooper, both of Delmar, N.Y.

[73] Assignee: General Electric Company, Pittsfield, Mass.

[21] Appl. No.: 718,834

[22] Filed: Aug. 30, 1976

[51] Int. Cl.$^2$ ............................................. C08G 65/44
[52] U.S. Cl. ................................................ 260/47 ET
[58] Field of Search ................................... 260/47 ET

[56] References Cited

U.S. PATENT DOCUMENTS

| | | | |
|---|---|---|---|
| 3,733,299 | 5/1973 | Cooper et al. | 260/47 ET |
| 3,787,361 | 1/1974 | Nakashio et al. | 260/47 ET |
| 3,900,445 | 8/1975 | Cooper et al. | 260/47 ET |
| 3,914,266 | 10/1975 | Hay | 260/438.1 |
| 3,988,297 | 10/1976 | Bennett et al. | 260/47 ET |

*Primary Examiner*—Lester L. Lee
*Attorney, Agent, or Firm*—Morgan, Finnegan, Pine, Foley & Lee

[57] ABSTRACT

A novel process is disclosed for the preparation of polyphenylene ethers by an oxidative coupling reaction. The process comprises oxidatively coupling a phenolic compound in the presence of a catalyst which comprises a copper complex of a copper compound with an N,N$^1$-disubstituted alkylene or cycloalkylene diamine having from 2 to 3 carbon atoms between the nitrogen atoms and whose substituents on the two nitrogens atoms are isopropyl or alpha tertiary alkyl, a tertiary amine, a secondary mono-amine and a bromine containing compound.

20 Claims, No Drawings

METHOD FOR PREPARING POLYPHENYLENE ETHERS

This invention is concerned with a process for the preparation of a polyphenylene ether resin by oxidatively coupling a phenolic compound in the presence of a catalyst which comprises a copper complex of a copper compound with an N,N[1]-disubstituted alkylene or cycloalkylene diamine having from 2 to 3 carbon atoms between the nitrogen atoms and whose substituents on the two nitrogen atoms are isopropyl or alpha tertiary alkyl, a tortiary amine, a secondary mono-amine and a bromine containing compound.

BACKGROUND OF THE INVENTION

The polyphenylene ethers and processes for their preparation are known in the art and described in numerous publications including Hay, U.S. Pat. No. 3,306,874 and Pat. No. 3,306,875. Other procedures are described in Van Dort, U.S. Pat. No. 3,365,422, Bennett and Cooper, U.S. Pat. No. 3,639,656, 3,642,699, 3,733,299, 3,838,102 and 3,661,848. All of these patents are incorporated herein by reference.

The processes most generally used to produce the polyphenylene ethers involve the self-condensation of a monovalent phenol in the presence of an oxygen-containing gas and a catalyst. Thereafter, chelating agents have been used to extract the catalyst into an aqueous phase which can be separated from the polymer solution or simply to form a chelate with the catalyst which is soluble in the precipitating medium (if the phases are not separated before precipitation). Antisolvents have been used to cause the polyphenylene ether polymer to precipitate.

Active catalyst systems have been developed for the preparation of polyphenylene ethers by the oxidative coupling of 2,6-di-substituted phenolic compounds. These systems are disclosed in U.S. Pat. No. 3,914,266 which is hereby incorporated by references. An example of one of the catalysts disclosed in that patent is a copper bromide complex, N,N'-di-tert-butylene-diamine, and a tertiary amine. This type of catalyst system permits fast polymerization but when employed at a high ratio of 2,6-disub-substituted phenolic compound to copper and amine, yields a polymer that appears to be of good quality, undistinguishable from that produced with other catalyst systems except that the color is usually not as good as polymer produced by, for example, copper salt-secondary amine catalyst systems. However, for reasons that are not fully understood, when polymer produced by this catalyst system is blended with styrene resins such as rubber modified polystyrene, the product has lower impact strength and poorer thermal oxidative stability, as measured by time to embrittlement at 115° C than blends made from a polyphenylene ether resin prepared with the copper halide-secondary amine catalyst.

It has now been found that the inclusion of a minor amount of a secondary mono-amine in the catalyst system of U.S. Pat. No. 3,914,266 will result in the production of polyphenylene ethers having properties that permit the preparation of compositions with styrene resins which produce molded articles having good physical properties. The secondary mono-amine also aids in the phase separation of the polymer containing phase after addition of an aqueous solution containing the chelating agents as compared to a reaction mixture from a polymerization that is carried out in the absence of a secondary mono-amine.

Accordingly, it is a primary object of this invention to provide a rapid process for the preparation of polyphenylene ether resins that may be employed to produce polyphenylene ether-styrene resin compositions which have good physical properties.

DETAILED DESCRIPTION OF THE INVENTION

The present invention is directed to an improved process for forming a polyphenylene ether resin by the oxidative coupling of a 2,6-di-substituted phenolic compound in the presence of a catalyst which comprises a copper compound, a diamine wherein the two amino nitrogens are separated by at least two and no more than three carbon atoms and the carbon atom to which the amino nitrogens are attached are aliphatic, a tertiary amine, and a bromine containing compound selected from the group consisting of hydrogen bromide, alkali metal bromides, alkaline earth metal bromides, 4-bromophenols in the presence of an oxygen-containing gas and mixtures thereof. The improvement comprises adding to the polymerization reaction, an amount of a secondary mono-amine of the formula:

wherein R and R' are independently selected from the group consisting of lower alkyl of from 1 to 12 carbon atoms, and preferably lower alkyl of from 3 to 6 carbon atoms that will modify the reaction so that a polyphenylene ether resin will be obtained that when combined with a styrene resin will form a composition having physical properties that are improved over compositions of a polyphenylene ether resin and a styrene resin wherein the polyphenylene ether resin is prepared by an identical catalyst system except for the absence of a secondary mono-amine.

The improved process of the invention is broadly applicable to the preparation of polyphenylene ethers of the formula:

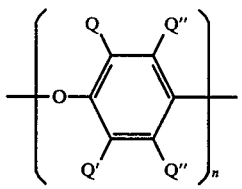

wherein Q is a hydrocarbon radical, a halogen radical having at least two carbon atoms between the carbon atom and the phenyl nucleus, and Q' and Q" are the same as Q, and in addition, halogen, provided that Q, Q' and Q" are all free of a tertiary carbon atom.

The preferred polyphenylene ethers that are prepared by the process of the invention are those wherein Q and Q' are hydrocarbon radicals having from 1 to 8 carbon atoms and Q" are each hydrogen. The especially preferred polyphenylene ethers are those where Q and Q' are methyl and each Q" is hydrogen.

Examples of secondary mono-amines that may be employed are found in the above-mentioned Hay patents. Suitable lower alkyl substituents include methyl, ethyl, n-propyl, i-propyl n-butyl, n-hexyl, n-octyl, n-decyl, and the like. The preferred secondary amine is di-n-butylamine. Useful diamines include those of the formula:

$$R^1HN-R^2-NHR^1$$

wherein each $R^1$ is independently isopropyl, a $C_{4-8}$ tertiary alkyl or a cycloalkyl group having no hydrogens on the alphacarbon atom. $R^2$ has at least two and no more than three carbon atoms separating the two nitrogen atoms and is $C_{2-4}$ alkylene or $C_{3-7}$ alkylene and examples of these compounds include N,N'-di-t butylethylene diamine; N,N'-di-t-amylethylenediamine and N,N'-diisopropylethylenediamine.

The tertiary amine should be one having low steric requirements. Examples of these compounds are tri-lower-alkyl amines wherein the alkyl groups are of from 1 to 6 carbon atoms such as trimethylamine or n-butyldimethylamine. In addition cyclic amines such as N-methylpyrrolidine may be employed. A preferred species is n-butyldimethylamine.

The useful 4-bromophenols include 4-bromo-2,6-disubstituted phenols such as 4-bromoxylenol and the like. The alkali metal bromides and alkaline earth metal bromides include bromides such as sodium bromide, calcium bromide and the like. Other bromides are listed in U.S. Pat. No. 3,733,299 which is hereby incorporated by reference.

Copper bromide-4-bromoxylenol solutions may be prepared for use in the practice of the invention by adding bromine to a suspension of cupric carbonate or cuprous oxide in methanol containing an excess of 2,6-xylenol. The bromine reacts with the xylenol to produce 4-bromoxylenol, the hydrogen bromide produced in this reaction converts the copper compound to a copper bromide.

In the practice of the invention, a weight ratio of 2,6-di-substituted phenolic compound to secondary amine of from 50:1 to 500:1 may be employed and more preferably, a ratio of 100:1 to 300:1 may be employed. The molar ratio of the tertiary amine to copper may be from 10-40 moles/g. atom of copper and preferably from 20-40 moles/g. atom of copper. The molar ratio of 2,6-di-substituted phenol to copper is from 400:1 to 1500:1 and preferably 500:1 to 1000:1. The ratio of atoms of bromine per atom of copper is from 5:1 to 50:1 and preferably 5:1 to 30:1. The diamine may be employed at a ratio of 1 to 3 moles of diamine per g/atom of copper preferably 1 to 2 moles per gram atom. The particular copper compound is not critical. Useful copper compounds include cuprous chloride, cuprous bromide, cuprous sulphate, cuprous azide, cuprous tetramine sulphate, cuprous acetate, cuprous butyrate, cuprous toluate, cupric chloride, cupric bromide, cupric sulfate, cupric azide, cupric tetramine sulfate, cupric acetate, cupric toluate, and the like. Preferred cuprous and cupric salts are the halides, cuprous bromide and cupric bromide being most preferred. These compounds may be prepared in situ by the reaction of bromine or hydrogen bromide with cuprous oxide or cupric carbonate.

The catalyst may be prepared in accordance with procedures known in the art, using methanol as the catalyst solvent.

The styrene resins are well known and will comprise at least 25% by weight of units of the formula:

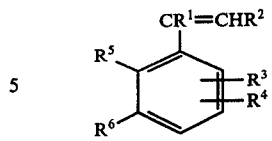

wherein $R^1$ and $R^2$ are selected from the group consisting of (lower) alkyl or alkenyl groups of from 1 to 6 carbon atoms and hydrogen; $R^3$ and $R^4$ are selected from the group consisting of hydrogen and (lower) alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred compound. Compositions of polyphenylene ethers and styrene resins are described in Cizek, U.S. Pat. No. 3,383,435 which is incorporated by reference.

The styrene resins may include units derived from a α,β-unsaturated cyclic anhydride of the formula:

$$R^7-C(H)_n----\overset{R^8}{C}----(CH_2)_m-R^9$$

wherein the dotted lines represent a single or a double carbon to carbon bond, $R^7$ and $R^8$ taken together represents a $$\overset{O}{\underset{C}{\|}}-O-\overset{O}{\underset{C}{\|}}$$

linkage, $R^9$ is selected from the group consisting of hydrogen, vinyl, alkyl, alkenyl, alkylcarboxylic or alkenyl-carboxylic of from 1 to 12 carbon atoms, $n$ is 1 or 2, depending on the position of the carbon-carbon double bond, and $m$ is an integer of from 0 to about 10. Examples include maleic anhydride, citraconic anhydride, itaconic anhydride, aconitic anhydride, and the like.

Rubber may be used in the preparation of the styrene resins to upgrade the physical properties of these resins according to well known techniques. The rubber employed may be a polybutadiene rubber, butyl rubber, styrene-butadiene rubber, acrylonitrile rubber, ethylene-propylene copolymers, natural rubber, EPDM rubbers, polysulfide rubbers, polyurethane rubbers, epichlorohydrin rubbers and the like.

The styrene resins may be homopolymers or they may comprise 40 to 1 parts by weight of the α,β-unsaturated cyclic anhydride, from 60 to 99 parts by weight of a styrene compound and from 0 to 25 parts, preferably from 5 to 15 parts by weight of rubber. A preferred styrene resin is high-impact rubber-modified polystyrene. An example of a useful high-impact rubber-modified polystyrene resin is Foster Grant 834 which contains about 8% of polybutadiene rubber.

The reaction is preferably carried out with oxygen as the oxygen-containing gas, although air and mixtures of air with inert gases may be employed. It is prefered to employ an aromatic solvent such as benzene or toluene as the reaction medium. Other solvents mentioned in the Hay patents may also be employed.

In a preferred manner of carrying out the invention a suitable reaction vessel is charged with the solvent, amines and the other catalyst components. A stream of oxygen is introduced near the bottom of the reaction vessel and the monomer is gradually added over a period of 30–40 minutes. Polymerization is carried out until a polymer is obtained that has an intrinsic viscosity of about 0.4 to 0.6 as measured in chloroform at 30° C. Generally any water that is formed in the polymerization need not be removed. The polymer may be recovered from the reaction mixture according to standard procedures. Subsequent to the making of the present invention, it was discovered that this polymerization reaction could be moderated by the use of water in the polymerization reaction. This discovery is described and claimed in application Ser. No. 718,836, filed Aug. 30, 1976.

A quaternary ammonium compound may be advantageously employed in the process of the invention. These compounds are of the formula:

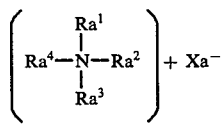

wherein $Ra^1$, $Ra^2$, $Ra^3$, and $Ra^4$ are alkyl, aralkyl, and alkenyl groups of from 1–24 carbon atoms and Xa is an anion. The preferred anions are halides such as bromine, chlorine, sulfate or phosphate.

Mixtures of the ammonium salts may also be employed the total number of carbon atoms in the $Ra^1$, $Ra^2$, $Ra^3$ and $Ra^4$ substituents should at least 10. The quaternary ammonium salts may be employed at a range of from 50–500 ppm based on the organic reaction solvent, and more preferably 100 to 200 ppm, based on the organic reaction solvent.

The alkyl substituents may be methyl, ethyl, propyl, butyl, hexyl, octyl, decyl, cetyl, hexadecyl and isomers thereof. Mixtures of these compounds may also be employed. The aralkyl substituent may include alkyl-mono-carbocyclic radicals having from 7 to 20 carbon atoms such as benzyl, phenethyl and the like. The alkenyl substituents include straight and branched chain unsaturated hydrocarbon atoms of from 1–24 carbon atoms which contain one or more double bonds.

The quaternary ammonium salts are well known and many are commercially available. For example, reference may be made to Kirk-Othmer Encyl. of Chemical Technology, second edition, Volume 16, pp. 859–865; Arquads, Armour Industrial Co. (1956) and Schwartz, A. M. et al, Surface Active Agents, Vol. 1, pp. 156–171 and Interscience Publishers (1949) and Vol. II, pp. 112–118 (1958), all of which are incorporated by reference. A particularly useful compound is methyl-tri-n-octylammonium chloride.

DESCRIPTION OF THE PREFERRED EMBODIMENTS

The following examples illustrate the process of this invention. They are merely illustrative and are not to be construed to limit the invention in any manner whatsoever.

EXAMPLE I

Two polymerizations were carried out in a one-gallon reactor equipped with an internal cooling coil, oxygen inlet, and a thermocouple well. The first polymerization was a control reaction that was carried out using a mixed amine catalyst as follows: 315 grams of 2,6-xylenol was dissolved in an equal weight of toluene. 1600 ml. of toluene was added to the reactor, followed by 100 ml. of the solution of 2,6-xylenol. 24 ml. of a catalyst solution prepared by adding 8.58 g. of bromine to 100 ml. of methanol containing 1.23 g. of basic cupric carbonate and 13.1 g. os xylenol was added, then 0.8 g. of N,N'-di-tert-butylethylene-diamine, and 4.5 of butyldimethylamine. The mixture was stirred vigorously, a rapid stream of oxygen was introduced near the bottom of the vessel and the remainder of the xylenol solution was added through a metering pump over a period of fifteen minutes. The temperature of the reaction mixture was held at 25° to 30° C by circulating water through the cooling coil. At 75 minutes after the beginning of the xylenol addition 5.4 g. of a 38% aqueous solution of the trisodium salt of ethylenediaminetetracetic acid was added, with 15 ml. of water. The mixture was stirred for fifteen minutes and drawn off and the polymer was precipitated by the addition of 1.75 volumes of methanol. It was filtered off, reslurried once with methanol, filtered, washed with methanol on the filter, and dried under vacuum. The intrinsic viscosity of the polymer, measured in chloroform solution at 30° C., was 0.56 dl./g.

A second polymerization was carried out according to the present invention using a mixed amine catalyst and di-n-butylamine. This polymerization was identical to the first polymerization except that 3.15 g. of di-n-butylamine was added to the solution of xylenol in toluene. The intrinsic viscosity of the polyphenylene oxide after 80 minutes reaction time, was 0.57 dl./g.

A third polymerization was carried out according to the present invention using a mixed amine catalyst and di-n-butylamine. In this run, 1.6 g. of di-n-butylamine was added (weight ratio-xylenol:di-n-butylamine 200:1).

COMPARATIVE TESTING

Fifty parts by weight of each of the polymers produced in Example I were blended with 50 parts of rubber modified polystyrene*, 3 parts of triphenyl phosphate, 0.5 parts tridecyl phosphite, 0.15 parts zinc sulfide, 0.15 parts zinc oxide. The blends were extruded at 600° F. in a 28 mm twin screw extruder and the extruded pellets molded at 500° F. into standard test bars using a 3 oz. screw injection molding machine. Another blend, made from polyphenylene oxide produced by polymerization with a cupric chloride — sodium bromide — dibutyl amine catalyst was similarly extruded and molded. Properties of the blends are listed below in Table 1.

*Foster Grant 834 containing about 8% of polybutadiene rubber.

TABLE I

| Property | poly 2,6-dimethyl-1,4-phenylene ether source | | | |
| --- | --- | --- | --- | --- |
| | "Mixed Amine" (no secondary monoamine) | "Mixed Amine" (1-lb DBA/100 lb of xylenol) | "Mixed Amine" (0.5 lb DBA/100 lb of xylenol) | CuCl$_2$-NaBr-DBA 16 lb DBA/100 lb of xylenol) |
| Color | brown | light yellow | light yellow | tan |
| Izod Impact (ft./lbs./in. of notch) | 2.4 | 3.2 | 3.0 | 3.0 |
| Gardner Impact | 125 | 150 | 150 | 150 |
| Tensile Strength (psi) | 8000 | 8500 | — | 8600 |
| Elongation | | | | |

TABLE I-continued

| Property | poly 2,6-dimethyl-1,4-phenylene ether source | | | |
|---|---|---|---|---|
| | "Mixed Amine" (no secondary monoamine) | "Mixed Amine" (1-lb DBA/ 100 lb of xylenol) | "Mixed Amine" (0.5 lb DBA/100 lb of xylenol) | CuCl$_2$-NaBr-DBA 16 lb DBA/100 lb of xylenol |
| (%) | 58 | 61 | — | 55 |

EXAMPLES 2-6

A control run was carried out using the following procedure. A one-gallon stainless steel reactor equipped with a turbine-blade stirrer, an internal cooling coil, and an oxygen inlet tube set near the bottom of the reactor was charged with 1700 ml of toluene, 2.0 g of N,N$^1$-di-tert-butyl ethylenediamine, 11.7 g of n-butyl dimethyl-amine, 0.63 g of trioctylmethyl-ammonium chloride, and 212 g of methanol containing 5.3% water. Catalyst solution was prepared by adding 9.1 g of 48% aqueous hydrobromic acid to a stirred suspension of 0.42 g of cuprous oxide in 50 ml of methanol. The catalyst solution was added to the reactor, a rapid stream of oxygen was introduced, and a solution of 610 g of 2,6-xylenol in an equal weight of toluene was added over a period of thirty minutes. The temperature was allowed to increase to 40° C and then held at this temperature. After 70 minutes the oxygen was turned off, and 22 g of a 38% aqueous solution of the trisodium salt of ethylenediaminetetraacetic acid was added. The polymer was precipitated by the addition of methanol, filtered, washed with methanol, and dried. The intrinsic viscosity of the polymer, measured in chloroform solution at 30° C, was 0.53 dl/g.

Examples 2-6 were carried out according to the procedures described above, except that 6.1 g of a secondary amine was added to the mixture before starting the reaction. The results are summarized in Table 2.

TABLE 2

| | Secondary Amine | Reaction Time (minutes) | I.V. (dl/g) |
|---|---|---|---|
| Control | none | 70 | .53 |
| 2 | diethylamine | 120 | .33 |
| 3 | di-n-propylamine | 90 | .51 |
| 4 | di-n-butylamine | 65 | .55 |
| 5 | di-isobutylamine | 65 | .72 |
| 6 | di-n-hexylamine | 70 | .46 |

PROPERTY EVALUATION 550 g of the polyphenylene ether resin, 450 g of rubber modified high impact polystyrene*, 10 g of tridecyl phosphite, 40 g of triphenyl phosphate, 50 g of titanium dioxide, 1.5 g of zinc sulfide, and 1.5 g of zinc oxide were blended together and extruded at 550° F in a 28 mm twin-screw extruder. The extruded pellets were then molded into standard test pieces in a 3 ounce screw injection molding machine. The results are summarized in Table 3.

TABLE 3

| | Secondary Amine | E (%) | T.Y. (psi) | T.S. (psi) | Izod Imp. ft.lbs./in.notch | Gard Imp. (in.lbs.) | Time to Embrittle (days at 115° C) |
|---|---|---|---|---|---|---|---|
| Control | None | 35 | 9,300 | 8,200 | 3.5 | 80 | 10 – 14 |
| 2 | diethylamine | 33 | 8,600 | 7,600 | 1.6 | 60 | 10 – 14 |
| 3 | dipropylamine | 82 | 9,700 | 8,600 | 5.0 | 350 | 49 – 52 |
| 4 | di-n-butylamine | 65 | 9,600 | 8,400 | 4.8 | 275 | 49 – 52 |
| 5 | di-isobutylamine | 47 | 10,400 | 9,800 | 4.8 | 275 | 49 – 52 |
| 6 | di-n-hexylamine | 41 | 9,200 | 8,000 | 3.6 | 140 | 14 – 17 |

*Foster Grant 834 containing about 8% polybutadiene rubber.

EXAMPLES 7-8

In a control polymerization, a ten gallon stainless steel reactor was charged with 4.0 gallons of toluene, 3130 ml of methanol containing 5.4% water, 148.7 g of butyldimethyl amine, 17.94 g of N,N$^1$-di-tert-butyl-ethylenediamine and 5.5 g of trioctylmethylammonium chloride. 3.73 g of cuprous oxide was stirred for ten minutes in 86 g of 48% aqueous hydrobromic acid and the solution was added to the reactor. The mixture was stirred, oxygen was introduced near the bottom of the reactor, and a solution of 12.2 lbs. of 2,6-xylenol in an equal weight of toluene was added over a period of 30 minutes. The temperature was maintained at 104° F and after eighty minutes the reactor was purged with nitrogen, 60.8 g of 30% aqueous solution of the disodium salt of nitrilotriacetic acid was added, followed by 2000 ml of water. Stirring was continued for ten minutes and the mixture was separated in a liquid-liquid centrifuge. The polymer was precipitated from the toluene phase by addition of methanol, filtered, washed and dried. Two other reactions were carried out according to the present invention except that 55 g of di-n-butylamine was added in one case and 55 g of di-iso-butylamine in the other. The polymers were extruded and molded in a 55:45 ratio of poly (2,6-dimethyl-1,4-phenylene ether) and rubber modified polystyrene according to the procedure and formulation described in Example 1. Properties are summarized in Table 4.

TABLE 4

| | Secondary Amine | PPO I.V. (dl/g) | E (%) | T.Y. (psi) | T.S. (psi) | Izod Imp. (ft.lbs./in.) | Gard Imp. (in.lbs.) | Embrittlement (days at 115° C) | Yellowness Index |
|---|---|---|---|---|---|---|---|---|---|
| Control | None | .48 | 71 | 8,400 | 8,200 | 1.9 | 175 | 14–17 | 22.6 |
| 7 | dibutylamine | .47 | 70 | 8,800 | 8,200 | 3.4 | 400 | 39–42 | 15.5 |
| 8 | di-isobutylamine | .47 | 67 | 8,800 | 7,800 | 4.3 | 325 | 35–39 | 16.1 |

EXAMPLES 9-15

A one-liter stirred reactor was charged with 410 ml of toluene, 60 g of methanol 0.455 g of di-tert-butylethylene diamine, 0.14 g of trioctylmethyl ammonium chloride and 10 ml of a catalyst solution prepared by dissolving 1.75 g of cuprous oxide in 40 g of 48% aqueous hydrobromic acid and diluting to 200 ml with methanol. Small amounts of various other amines were also added at this point. Oxygen was introduced into the reactor and a solution of 140 g of 2,6-xylenol in 140 g of toluene was added over a period of 35 minutes. At the end of the desired reaction time a small sample was withdrawn, shaken with a few drops of a 38% aqueous solution of the trisodium salt of ethylenediamine tetraacetic acid, and the polymer was precipitated with methanol, dried, and the intrinsic viscosity was measured in chloroform at 30° C. Results are listed in Table 5.

TABLE 5

|    | Added Amine | Reaction Time (mins.) | I.V. (dl/g) |
|----|-------------|----------------------|-------------|
| 9  | n-octylamine (1.15 g) | 120 | .22 |
| 10 | n-hexylamine (1.1 g) | 70 | .14 |
| 11 | dicyclohexylamine (2.0 g) | 80 | .13 |
| 12 | di-n-butylamine (1.4 g) | 70 | .45 |
| 13 | di-isobutylamine (1.4 g) | 70 | .65 |
| 14 | di-n-hexylamine (1.95 g) | 80 | .43 |

EXAMPLE 16

The procedure of Examples 7–8 was followed except that the reaction temperature was increased to 125° F and 90 g of a 38% aqueous solution of the trisodium salt of ethylenediamine-tetraacetic acid was used to extract the catalyst. Extrusion and molding with rubber modified polystyrene was carried out as described in Examples 7–8. The properties of blends made from the polymer made with no secondary amine added and with one part of dibutylamine for each hundred parts of 2,6-xylenol are listed below, along with those of a control sample made with a cupric halide-dibutylamine catalyst (one pound of DBA for 7 lbs. of xylenol).

|  | Amine | Elongation | Izod ft/lbs/in | Gardner in.lbs. | Time to Embrittlement (days at 115° C) |
|--|-------|------------|----------------|-----------------|------------------------------------------|
| Control | None | 41 | 2.6 | 175 | 14–17 |
| 16 | DBA (1 lb/100) | 72 | 4.5 | 375 | 38–42 |
| Control | Cu halide-DBA catalyst | 61 | 4.3 | 275 | 42–45 |

Although the above example has shown various modifications of the present invention, other variations are possible in the light of the above teachings. It is, therefore, to be understood that changes may be made in the particular embodiments of the invention described which are within the full intended scope of the invention as defined by the appended claims.

We claim:
1. In a process for forming a polyphenylene ether resin by the oxidative coupling of a 2,6-disubstituted phenolic compound in the presence of a catalyst which comprises a copper compound, a diamine of the formula:

$$R^1HN-R^2-NHR^1$$

wherein each $R^1$ is independently isopropyl, a $C_{4-8}$ tertiary alkyl or a cycloalkyl group having no hydrogens on the alphacarbon atom and $R^2$ is $C_{2-4}$ alkylene or $C_{3-7}$ cycloalkylene; a tertiary amine; a bromine containing compound selected from the group consisting of hydrogen bromide, alkali metal bromides, alkaline earth metal bromides, 4-bromophenols and mixtures thereof in the presence of an oxygen containing gas, the improvement which comprises adding to the polymerization reaction an amount of a secondary mono-amine of the formula:

wherein R and R' are independently selected from the group consisting of lower alkyl of from 1 to 12 carbon atoms; said amount being sufficient to modify the reaction so that a polyphenylene ether resin will be obtained that when combined with a styrene resin will form a composition having impact that are improved over compositions of a polyphenylene ether resin and a styrene resin wherein the polyphenylene ether resin is prepared by identical catalyst system except for the absence of a secondary mono-amine.

2. A process as defined in claim 1 wherein the secondary amine is selected from compounds of the formula:

wherein R and R' are independently selected from the group consisting of lower alkyl of 3 to 6 carbon atoms.

3. A process as defined in claim 1 wherein said polyphenylene ether is of the formula:

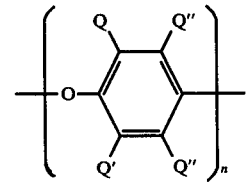

wherein Q is a hydrocarbon radical, a halogen radical having at least two carbon atoms between the carbon atom and the phenyl nucleus, and Q' and Q" are the same as Q and in addition, halogen, provided that Q, Q' and Q" are all free of a tertiary carbon atom and n is at least 50.

4. A process is defined in claim 1 wherein Q and Q' are hydrocarbon radicals having from 1 to 8 carbon atoms and Q" are each hydrogen.

5. A process as defined in claim 4 wherein Q and Q' are each methyl radicals.

6. A process as defined in claim 1 wherein the copper compound is cuprous bromide.

7. A process as defined in claim 1 wherein said tertiary amine is n-butyldimethylamine.

8. A process as defined in claim 2 wherein said 4-bromophenol is 4-bromoxylenol.

9. In a process for forming a polyphenylene ether by the oxidative coupling of a 2,6-di-substituted phenolic compound in the presence of a catalyst which comprises a copper compound, N,N'-di-tertbutylethylenediamine with low steric requirements, a 4-bromoxylenol, said process comprising passing oxygen through a solution of a 2,6-di-substituted phenol and said catalyst, the improvement which comprises adding to said catalyst a minor amount of a secondary amine selected from compounds of the formula:

wherein R and R' are independently selected from the group consisting of a lower alkyl of from 3 to 6 carbon atoms, said amount being sufficient to modify the reaction so that a polyphenylene ether resin will be obtained that when combined with a styrene resin will form a composition having impact properties that are improved over compositions of a polyphenylene ether resin and a styrene resin wherein the polyphenylene ether resin is prepared by identical catalyst system except for the absence of a secondary mono-amine, to produce a mixture of a complex catalyst and a polyphenylene ether resin, and therefore separating a polyphenylene ether from said mixture by precipitation with methanol.

10. A process as defined in claim 9 wherein said phenolic compound is 2,6-xylenol.

11. A process as defined in claim 10 wherein the poly (2,6-dimethyl-1,4-phenylene ether) resin has a polymerization degree of at least 50.

12. A process as defined in claim 11 wherein the secondary amine is di-n-butyl amine.

13. A process as defined in claim 11 wherein the secondary amine is di-isobutyl amine.

14. A process as defined in claim 11 wherein the secondary amine is di-n-propylamine.

15. In a process for forming a polyphenylene ether by the oxidative coupling of a 2,6-di-substituted phenolic compound in the presence of a catalyst which comprises a copper compound, N, N'-di-tert-butylethylenediamine, a tertiary amine with low steric requirements and hydrobromic acid, said process comprising passing oxygen through a solution of a 2,6-di-substituted phenol and said catalyst, the improvement which comprises adding to said catalyst a minor amount of a secondary amine selected from compounds of the formula:

wherein R and R' are independently selected from the group consisting of lower alkyl of from 3 to 6 carbon atoms, to produce a mixture of a complex catalyst and a polyphenylene ether resin, and thereafter separating the polyphenylene ether from said mixture.

16. A process as defined in claim 15 wherein said phenolic compound is 2,6-xylenol.

17. A process as defined in claim 15 wherein the poly (2,6-dimethyl-1,4-phenylene ether) resin has a polymerization degree of at least 50.

18. A process as defined in claim 17 wherein the secondary amine is di-n-butyl amine.

19. A process as defined in claim 17 wherein the secondary amine is di-isobutyl amine.

20. A process as defined in claim 17 wherein the secondary amine is di-n-propylamine.

* * * * *